No. 803,834. PATENTED NOV. 7, 1905.
C. W. LARSON.
CONTROL SYSTEM.
APPLICATION FILED APR. 17, 1905.

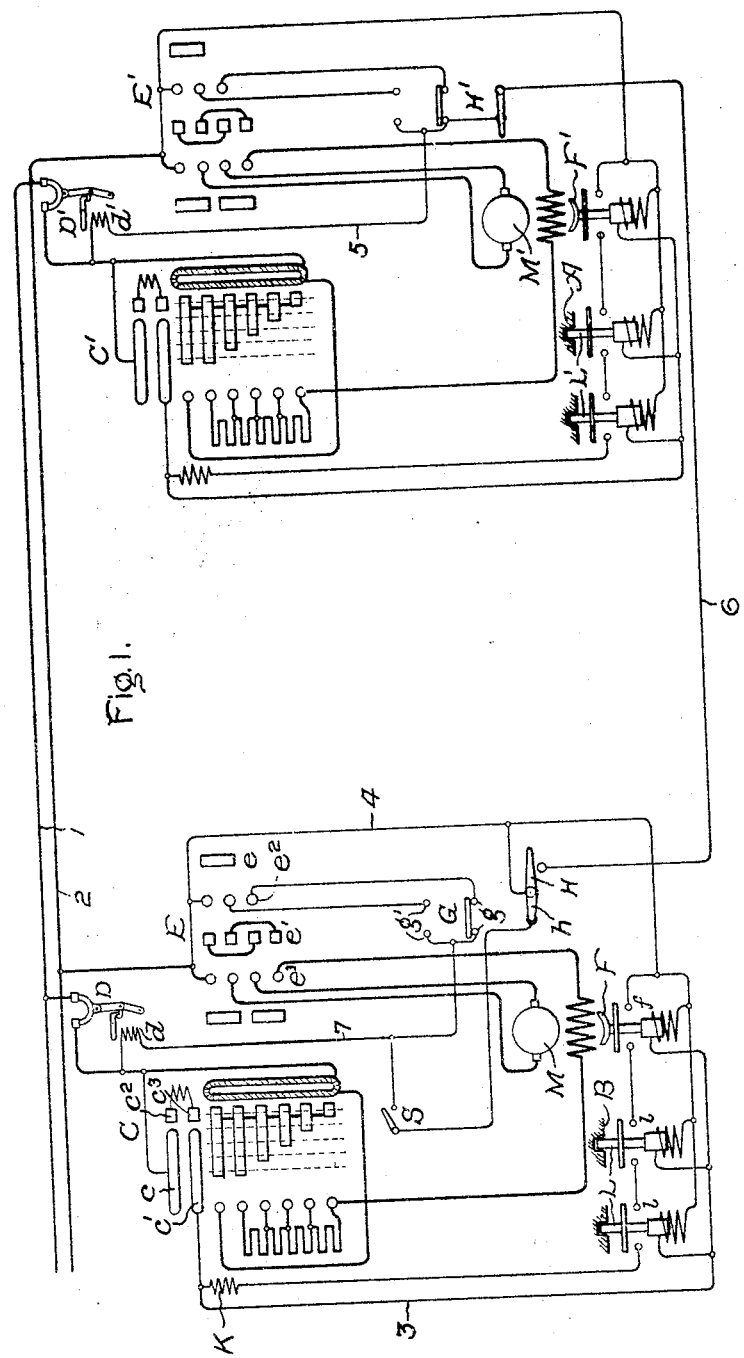

Witnesses.

Inventor:
Carl W. Larson.
by Albert G. Davis
Att'y

UNITED STATES PATENT OFFICE.

CARL W. LARSON, OF SCHENECTADY, NEW YORK, ASSIGNOR TO GENERAL ELECTRIC COMPANY, A CORPORATION OF NEW YORK.

CONTROL SYSTEM.

No. 803,834.  Specification of Letters Patent.  Patented Nov. 7, 1905.

Application filed April 17, 1905. Serial No. 255,887.

*To all whom it may concern:*

Be it known that I, CARL W. LARSON, a citizen of the United States, residing at Schenectady, county of Schenectady, State of New York, have invented certain new and useful Improvements in Control Systems, of which the following is a specification.

The present invention relates to control apparatus for electric motors. Where the mechanism or apparatus to be operated by the motor or motors is normally held by locks or brakes, it is imperative that these locks or brakes be released before current is supplied to the motor or motors, since otherwise serious injury might result. In one of its aspects the present invention may be regarded as comprising means associated with motor-control apparatus for preventing current from being supplied to a motor or motors until all locks, brakes, or other restricting devices are released.

In some cases it is necessary that control apparatus for independently-operated parts be so related to each other that a definite sequence in the positioning of the parts must be maintained. In rolling lift-bridges, for example, care must be taken when closing the bridge that the leaves be brought down in proper order. When separate motors are employed for operating the leaves, they must be controlled in such a manner that an improper sequence in the closing movements of the leaves is impossible. In another aspect the present invention relates to means whereby the proper sequence of movement of two separately-operated elements is automatically brought about.

The present invention in these and other aspects will be more clearly understood in connection with the following description thereof.

Figure 4:
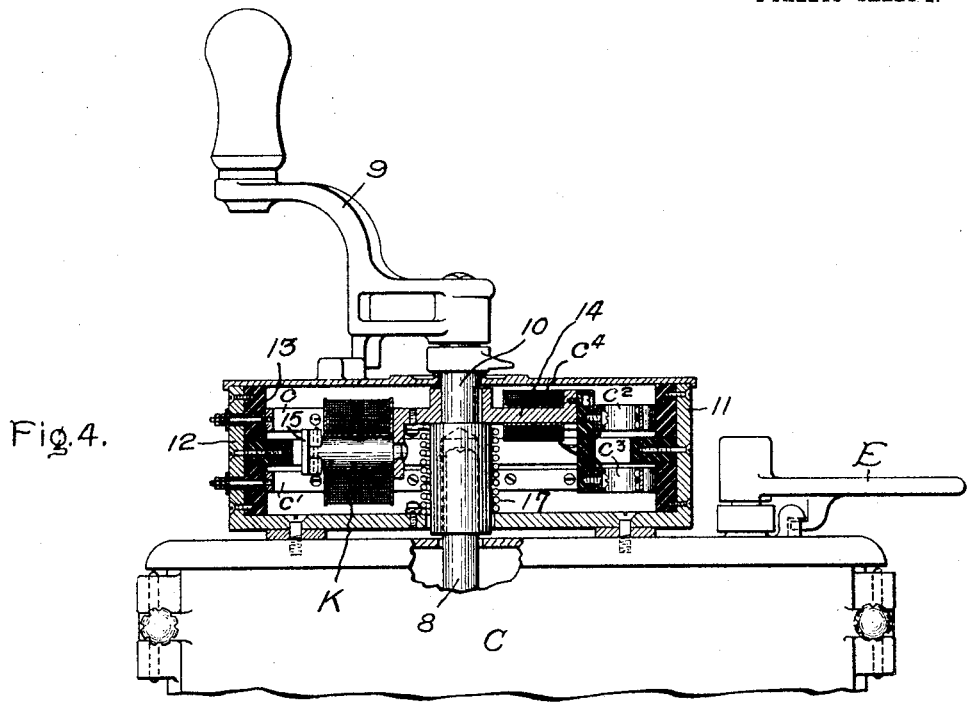
Figure 5:
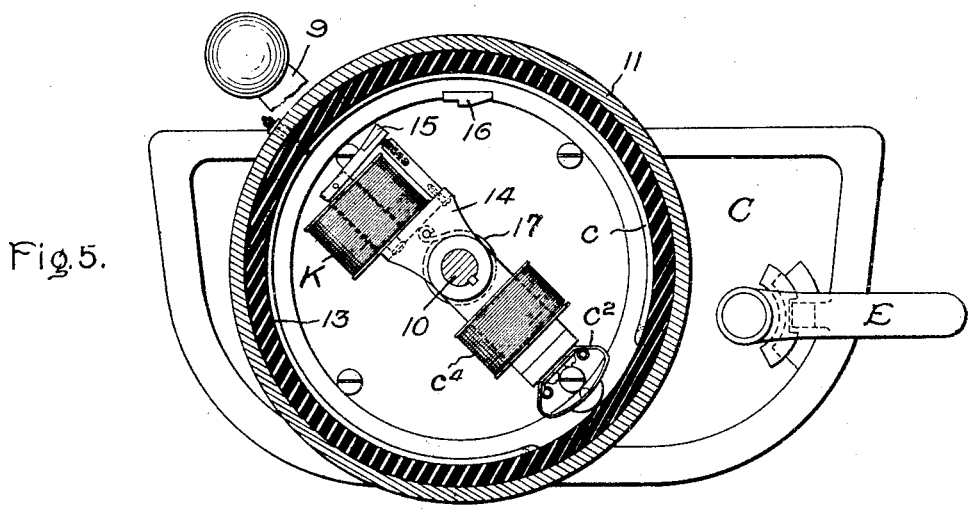

In the accompanying drawings, Figure 1 illustrates the electrical equipment for two bridge-leaves arranged in accordance with the present invention. Figs. 2 and 3 show, respectively, a closed bridge and a partly-open bridge, together with a portion of the control apparatus associated therewith. Fig. 4 shows a portion of the controller and in cross-section the controller-locking arrangement. Fig. 5 is a plan view of the parts shown in Fig. 4, with the upper cap on the controller-handle removed.

Similar reference characters will be used throughout the specification and drawings to indicate like parts.

The present invention is illustrated specifically as embodied in bridge-controlling apparatus and will be described in detail, it being, however, understood that this particular embodiment is simply illustrated as one of the uses to which the invention may be placed.

Separate motors and separate control apparatuses are provided for the two bridge-leaves, and the motor-controller is arranged to have a slight preliminary movement for energizing the bridge-lock and brake-coils before the motor-circuit is completed. A locking device adjacent the controller locks it against further movement until a lock-releasing device is energized by current flowing through a circuit which is completed only when all the bridge-locks and brakes are in released positions. I have further provided means for opening the motor-circuits whenever the bridge members occupy either the full open or full closed position, this being accomplished by providing auxiliary switches which energize circuit-breaker tripping means at the proper points. In addition I have provided auxiliary switch mechanism whereby one bridge-leaf automatically stops at a predetermined point of its closing movement in case it precedes the other bridge-leaf in reaching that point, but does not stop in case the other bridge-leaf has reached that position first.

The bridge-leaves A and B are provided with interlocking projections $a$ and $b$, the projection $a$ being adapted to rest upon the projection $b$ when the bridge is lowered, and therefore the leaf B must be lowered first.

M M' are two motors which are arranged to operate the bridge-leaves B and A, respectively. C and C' are controllers for the motors M and M'.

D and D' are circuit-breakers arranged to connect the motor M and the motor M', respectively, to current-supplying mains.

E and E' are reversing-switches.

L L and L' L' are locks adapted to engage, respectively, with the leaves B and A.

F and F' are brakes adapted to bring the motors M and M' to rest on interruption of current.

The controllers C and C' may be of any usual type. That illustrated consisting of a cylinder carrying contact-segments which are adapted to first complete the motor-circuit through a series of resistance-sections and then to cut out the resistance-sections one at a time until the motors are connected across the line with no resistance in circuit. Since the two controllers are similar to each other, only one—namely, C—will be described. In addition to the usual controller-contacts I have provided a pair of elongated fixed contacts $c\ c'$, together with a pair of connected movable contacts $c^2$ and $c^3$, the arrangement of contacts being such that the contacts $c^2$ and $c^3$ engage with the contacts $c$ and $c'$ before any of the main controller-contacts come into operative engagement with each other. The function of these auxiliary contacts is to complete a circuit from line 1 through the circuit-breaker D, wire 3, the releasing-coils of the lock L and brake F, wire 4, to line-wire 2. The first movement of the controller-handle therefore serves to energize the lock-releasing and brake-releasing coils, whereby the bridge member and the motor become free to move when current is supplied to the motor. The controller is provided with a lock, to be hereinafter described, which permits the controller to be moved only from the "off" position to a position just short of the first running position. This lock is released when the coil K is energized. The circuit of the coil K passes through auxiliary contacts $l\ f$, which are closed when the locks L and the brake F are in their retracted positions. As soon, therefore, as the bridge-locks and brake have been retracted the coil K is energized, and the controller is free to move to its various running positions. If, however, any one of the bridge-locks or the brake fails to release, the circuit for the lock-releasing coil K remains interrupted, and the controller remains locked, thereby preventing current from being supplied to the motor until the operator finds the defect and remedies it.

The circuit-breaker D is provided with a tripping-coil $d$, which may be energized in several different ways, thereby tripping the circuit-breaker, interrupting the motor-circuit, and permitting the brake F to be applied. The coil $d$ is connected directly across the line through the reversing-switch and a double-throw switch G, the movable member of the switch G being connected to the bridge, so that when the bridge is in its lower position the circuit is completed through the fixed contacts $g$ and when the bridge is in its upper position to the contacts $g'$. Consequently the tripping-coil $d$ is energized and the motor-circuit automatically interrupted whenever the bridge-leaf B reaches its full-open or full-closed position.

Assuming that the bridge-leaf is in its lower position and it is desired to raise it, the reverser is thrown so as to bring the movable contacts $e$ and $e'$ into engagement with the fixed contacts $e^2$ and $e^3$. The circuit-breaker D may be closed and will remain closed because the circuit of the tripping-coil $d$ is interrupted at the lowermost of the fixed contacts $e^2$ of the reversing-switch. The motor M may now be operated to raise the leaf. When the leaf is fully raised, however, the contact $g'$ is bridged, and the circuit for the tripping-coil $d$ is completed through these contacts and through the two upper of the series of fixed contacts $e^2$, which are bridged by the movable contact $e$. The tripping-coil is therefore energized and the circuit-breaker tripped. When it is desired to lower the bridge-leaf, the reversing-switch is moved to its lowering position, and the circuit of the tripping-coil will remain interrupted until the switch G is moved to bridge the contacts $g$, which occurs when the bridge-leaf is fully lowered.

Since the two bridge-leaves are operated by separate motors and controllers, it may happen that the leaf A may be lowered ahead of the leaf B to such a point that the end of the leaf B cannot pass the end of the leaf A unless means is provided for preventing this. To this end I have arranged an additional circuit for energizing the tripping-coil $d'$ of the circuit-breaker D'—namely, through switches H and H', which are operated, respectively, by the leaves B and A during their opening and closing movements. When the two bridge-leaves are lowered, the switches H and H' are respectively open and closed, as shown. As the bridge-leaves open, however, the switch H is closed and the switch H' opened, this occurring when the bridge-leaves are in such a position that their meeting ends are free to interlock. When both switch H and H' are closed, a circuit is completed for the coil $d'$ from wire 1, breaker D', through coil $d'$, wire 5, switch H', wire 6, switch H, wire 4 to line 2. It is evident that both switches can be closed at the same time only in case the leaf A in its lowering movement closes the switch H' before the leaf B has descended far enough to again open the switch H. When this happens, the circuit-breaker D' will be tripped and the leaf A brought to rest until the leaf B can be brought to the interlocking position. In case, however, the leaf B descends slightly ahead of the leaf A the circuit-breaker D' is not tripped and the leaf A continues its movement to its lowered position. In case it is desired to compel the leaf B to stop at an intermediate point when lowered a switch $h$ may be associated with the switch H, the switch $h$ serving to close a circuit for tripping-coil $d$ from line 1, tripping-coil $d$, wire 7, switch S, and switch $h$ to wire 4 to line-wire 2. The switch S must be opened when the bridge is being raised and closed only after the bridge has passed the point at which the switches H and $h$ are operated.

In Figs. 4 and 5 I have shown the mechanical construction of a portion of the controller C, including the auxiliary contacts $c$ to $c^3$ and the locking device. This auxiliary mechanism is illustrated as forming an attachment to an old form of controller; but it is obvious that it may be arranged within the main controller-casing and form part of the controller. 8 is the controller-shaft, and 9 is a controller-handle connected to the shaft 8 by means of a short shaft 10. 11 is a casing secured to the top of the controller-casing in any suitable manner, so as to have its wall 12 concentric with the shafts 8 and 10. The fixed contacts $c$ and $c'$ are arranged within casing 11 and insulated therefrom by means of the insulation 13. The shaft 10 carries an arm 14, on one end of which are mounted the movable contacts $c^2$ and $c^3$, which, as the arm is rotated, engage with the fixed contacts $c$ and $c'$. Upon the end of the arm 14 opposite the contacts $c^2$ and $c^3$ is arranged a spring-actuated dog 15, which when the controller-handle is turned in a clockwise direction engages with a shoulder 16, projecting inwardly from the casing 11 and locks the controller against further movement. In this position of the controller the contacts $c^2$ and $c^3$ are in engagement with the contacts $c$ and $c'$; but the main controller-contacts have not yet come into operative engagement. The dog 15 forms the armature of a magnet of which the coil K is the energizing-coil. Therefore when the coil K is energized in the manner previously described the dog 15 is attracted sufficiently to pass the shoulder 16—namely, to release the controller and permit it to be moved into and through its various running positions. If desired, the contacts $c^2$ and $c^3$ may be connected by means of coil $c^4$, whereby a magnetic field is set up about the contacts $c^2$ $c^3$, which serves to interrupt any arc which may be formed upon moving these contacts into or out of engagement with the coöperating contacts $c$ $c'$. A spring 17 is secured at one end to the casing 11 and at the other end to the arm 14, the arrangement being such that when the controller-handle is turned the spring is placed under tension and serves to return the controller-handle to its "off" position as soon as the controller-handle is released.

It will now be seen that the present invention provides a simple and efficient form of bridge-operating apparatus in which it is impossible to injure the operating-motors by supplying them with current before all locks and brakes are removed and whereby the leaves are compelled to close in proper succession. At the same time the leaf which must reach its lowered position last does not necessarily stop at an intermediate point, but does so only when the other leaf gets behind, thereby enabling the bridge to be closed in the shortest possible time. With slight alterations the system disclosed may of course be made applicable to the control of movable parts other than bridge-leaves, and, moreover, although I have shown my improved controller in connection with a particular system of control, it is evident that the controller may be used in quite different systems of control and independently of the apparatus, which relates specifically to bridge control or to the control of a plurality of interdependent members or parts.

What I claim as new, and desire to secure by Letters Patent of the United States, is—

1. In combination, a part to be moved, a lock therefor, a motor, a motor-controller, a lock for said motor-controller, and means controlled by the lock for the part to be moved for releasing said controller-lock.

2. In combination, a part to be moved, a lock therefor, a motor-controller, a lock for said motor-controller, and means for releasing the controller-lock when the lock for the part to be moved is in its retracted position.

3. In combination, a motor, a brake therefor, a controller, a lock for preventing the controller from completing the motor-circuit, and means controlled by said brake for releasing the lock.

4. In combination, a motor, a brake therefor, a controller, a lock for preventing the controller from completing the motor-circuit, and means for releasing said lock when the brake is in its retracted position.

5. In combination, a part to be moved, a lock therefor, a motor, a motor-controller, means controlled by the controller in moving from its "off" position to its circuit-closing position for releasing said lock, a stop for preventing the controller from passing into the circuit-closing position, and means controlled by said lock for retracting said stop.

6. A controller comprising brake-controlling contacts and motor-controlling contacts, a stop for normally preventing the controller from closing the motor-controlling contacts, and an electromagnet for controlling said stop.

7. A controller comprising a rotatable member having brake-controlling contacts and motor-controlling contacts, coöperating contacts so arranged that the brake-circuit is closed before the motor-circuit, a stop which normally prevents the controller from moving to the motor-circuit-closing position, and electromagnetic controlling means for said stop.

8. In combination, a part to be moved, a lock therefor, a motor, a controller having lock-controlling and motor-controlling positions, a stop which normally prevents the controller from assuming the motor-controlling position, and means controlled by said lock for rendering said stop inoperative.

9. In combination, a part to be moved, a lock therefor, a motor, a controller comprising a rotatable member having lock-controlling and motor-controlling contacts, coöperating contacts so arranged that the lock-circuit is closed before the motor-circuit, means for normally preventing said controller from closing the motor-circuit, and means controlled by said lock for rendering said controller operative to close the motor-circuit.

10. In combination, a part to be moved, a lock therefor, a motor, a controller, a lock for limiting the movement of said controller, electromagnetic releasing means for said locks, means controlled by the controller for energizing the releasing means for the first lock, and means controlled by the first lock for energizing the releasing means for the other lock.

11. In combination, a part to be moved, a lock therefor, a motor, a motor-controller, a stop for preventing said motor-controller from closing the motor-circuit, an electromagnet for controlling said stop, and a switch for controlling said electromagnet associated with said lock.

12. In combination, a part to be moved, a lock therefor, a motor, a motor-controller, a stop for preventing said motor-controller from closing the motor-circuit, an electromagnet for controlling said stop, and a switch associated with said lock for completing a circuit through said electromagnet when the lock is retracted.

13. In combination, a part to be moved, a lock therefor, a motor, a controller comprising lock-controlling contacts and motor-controlling contacts, the arrangement being such that the lock-controlling contacts are closed before the motor-controlling contacts, a stop for preventing the motor-controlling contacts from closing, an electromagnet for controlling said stop, and means controlled by said lock when in its retracted position for energizing said electromagnet.

14. In a system of control, a pair of members to be moved, separate motive and control apparatus therefor including means controlled by each member for rendering its motive apparatus inoperative at predetermined points, and means for automatically stopping one of said members at an intermediate point when it precedes the other member to said point.

15. In a system of bridge control, a pair of bridge-leaves, separate control apparatus for each leaf, and means for automatically stopping one of said leaves at an intermediate point in its closing movement when it has preceded the other leaf to said point.

16. In a system of bridge control, a pair of bridge-leaves, separate motive and control apparatus for each leaf including means controlled by each leaf for stopping its motive apparatus when the leaf is in full-open or in full-closed position, and means for stopping the motive apparatus of one of said leaves at an intermediate point when it precedes the other leaf to that point.

17. In a system of bridge control, a pair of bridge-leaves, separate motive apparatus for each leaf, means for rendering the motive apparatus of each leaf inoperative when the leaves reach their full-open or full-closed positions, means for automatically stopping one leaf at a predetermined point in its closing movement, and means for bringing the other leaf to rest at said point only when it is the first to reach said point.

18. In a system of bridge control, a pair of bridge-leaves, separate motors for operating said leaves, a circuit-breaker arranged in the circuit of the operating-motor for one of said leaves, tripping means for said circuit-breaker, a normally open and a normally closed switch controlling said tripping means, and operative connections between said switches and the bridge-leaves whereby each switch is actuated when its respective bridge-leaf approaches a predetermined angle, the arrangement being such that the circuit-breaker is tripped when both switches are closed, whereby the motor-circuit of one leaf is opened and the leaf stopped at an intermediate point when the leaves descend in a certain order.

In witness whereof I have hereunto set my hand this 15th day of April, 1905.

CARL W. LARSON.

Witnesses:
 BENJAMIN B. HULL,
 HELEN ORFORD.